US008206206B2

(12) United States Patent
Kashima

(10) Patent No.: US 8,206,206 B2
(45) Date of Patent: Jun. 26, 2012

(54) GAMING MACHINE AND CONTROL METHOD OF GAMING MACHINE

(75) Inventor: Hiroaki Kashima, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1922 days.

(21) Appl. No.: 11/008,289

(22) Filed: Dec. 10, 2004

(65) Prior Publication Data

US 2007/0243920 A1 Oct. 18, 2007

(30) Foreign Application Priority Data

Dec. 10, 2003 (JP) ................................ P2003-412372

(51) Int. Cl.
*A63F 13/00* (2006.01)

(52) U.S. Cl. ................ 463/13; 463/12; 463/20; 463/21; 463/22; 463/23; 463/25; 463/26; 463/27; 463/28

(58) Field of Classification Search .................... 463/16, 463/20–22, 25, 30, 46, 12–13, 23, 26–28; 273/138.1, 142 R, 143 R, 143 A
See application file for complete search history.

(56) References Cited

U.S. PATENT DOCUMENTS

| | | | | | |
|---|---|---|---|---|---|
| 5,019,973 | A | * | 5/1991 | Wilcox et al. | 463/13 |
| 5,407,199 | A | * | 4/1995 | Gumina | 273/139 |
| 5,431,408 | A | * | 7/1995 | Adams | 273/306 |
| 5,645,486 | A | * | 7/1997 | Nagao et al. | 463/27 |
| 5,853,325 | A | * | 12/1998 | Kadlic | 463/13 |
| 6,302,790 | B1 | | 10/2001 | Brossard | |
| 6,312,334 | B1 | * | 11/2001 | Yoseloff | 463/25 |
| 6,692,361 | B1 | * | 2/2004 | Itskov | 463/43 |
| 6,910,963 | B1 | * | 6/2005 | Ohtsu et al. | 463/25 |
| 7,128,645 | B1 | * | 10/2006 | White et al. | 463/13 |
| 2002/0034976 | A1 | | 3/2002 | Webb | |
| 2003/0073489 | A1 | | 4/2003 | Hecht et al. | |

FOREIGN PATENT DOCUMENTS

| | | | |
|---|---|---|---|
| EP | 0 655 265 | A1 | 5/1995 |
| JP | 05-049755 | | 3/1993 |
| JP | 2001-120840 | A | 5/2001 |
| WO | 97/19736 | A1 | 6/1997 |
| WO | 01/83063 | A1 | 11/2001 |

* cited by examiner

*Primary Examiner* — Sunit Pandya
(74) *Attorney, Agent, or Firm* — Edwards Wildman Palmer LLP

(57) ABSTRACT

A gaming machine which determines establishment/non-establishment of a shift condition for shifting a game mode from a normal game mode to a special game mode, shifts to the special game mode based on the determination result, and allows an instruction of A player to be inputted thereto, extracts predetermined number of card data to be used in the special game mode, selects a first and a second card data on the gaming machine side and a player side from among the extracted card data, and determines right/wrong of a designating instruction according to a result of comparison between the card data. Upon win, this gaming machine determines establishment/non-establishment of a winning combination based on the extracted card data, and when a winning combination is established, the machine performs payout corresponding to the established combination.

3 Claims, 9 Drawing Sheets

(a)

(b)

(c)

GAMING MACHINE AND CONTROL METHOD OF GAMING MACHINE

CROSS REFERENCE TO RELATED APPLICATIONS

This application is based upon and claims the benefit of priority from the prior Japanese Patent Application No. 2003-412372, filed on Dec. 10, 2003 the entire contents of which are incorporated herein by reference.

BACKGROUND OF THE INVENTION

1. Field of the Invention

The present invention relates to a gaming machine on which a card game can be played with images of cards such as playing cards being displayed on a screen and a control method of the gaming machine.

2. Related Background Art

Conventionally, a gaming machine (referred to also as a card gaming machine) is known which displays card images showing playing cards on its display screen, which is realized by a liquid crystal display panel or CRT, and changes the display of each of the card images in accordance with operation input by a player to thereby make the game progress. On the gaming machine of this kind, games using playing cards, for example, a poker game and a blackjack game can be played. As a conventional card gaming machine on which the poker game can be played, a card gaming machine is disclosed in Japanese Unexamined Patent Application No. H5-49755 (hereinafter, referred to as "Patent Document 1") which decides winning combinations such as royal flush, full house, and so on depending on combinations of displayed cards and pays out media (hereinafter referred to as "coins") used in the game such as medals, coins, or the like, in accordance with the payout amount for each winning combination. This card gaming machine can shift to a double-down game (referred to also as a double-up game) when a predetermined condition is established during operation. Once the double-down game is selected by the player to start, the payout amount (the number of coins to be paid out) is increased if the player wins (the payout amount becomes zero if the player loses).

SUMMARY OF THE INVENTION

In the case of the above-described conventional gaming machine, however, the contents of the double-down game are just decision of win/loss based on right/wrong of a player's designation instruction (whether the designation of a specific card being bigger or smaller than "7" is right or wrong), and additionally the payout amount when the player wins is fixed constant (double) only. In other words, the conventional gaming machine has monotonous contents of the double-down game, which are not enough to keep the interest of the player, in particular, a player who prefers gambling, without tiring the player.

Hence, the present invention has been developed to solve the above-described problems and an object thereof is to make it possible, in a gaming machine on which card games including a double-down game can be played and a control method of the card gaming machine, to add other varied game properties to the double-down game to keep the player's interest.

To achieve the above-described object, the present invention is a gaming machine including determining means determining establishment/non-establishment of a shift condition for shifting a game mode from a normal game mode to a special game mode and shifting means shifting the game mode from the normal game mode to the special game mode based on the determination result of the determining means, characterized by including: extraction means extracting predetermined number of card data to be used in the special game mode, from a plurality of card data; selecting means selecting a first card data and a second card data, from among the predetermined number of card data extracted by the extraction means; right/wrong determining means determining right/wrong of a designating instruction for designating a result of comparison between the first and second card data, according to the result of comparison between the first card data and second card data; wining combination establishment/non-establishment determining means performing an establishment/non-establishment determination on a winning combination based on the predetermined number of card data extracted by the extraction means; and payout calculating means calculating a payout based on the determination result by the right/wrong determining means or the wining combination establishment/non-establishment determining means.

This gaming machine is configured to determine right/wrong of a designating instruction based on the result of comparison between the first card data and second card data, and determine establishment/non-establishment of a winning combination based on the extracted predetermined number of card data, so that the payout is calculated based on these determination results.

In the above-described gaming machine, it is preferable that, where processing from the extraction of the card data by the extraction means to the establishment/non-establishment determination on a winning combination by the wining combination establishment/non-establishment determining means is regarded as one game, the payout calculating means changes a payout rate for calculating the payout for each game.

This makes it possible that, in the games performed a plurality of times, even when both the determination results of the right/wrong determining means and the wining combination establishment/non-establishment determining means are the same in the games, the payout in each game can be changed.

Further, in the above-described gaming machine, it is possible that, where processing from the extraction of the card data by the extraction means to the establishment/non-establishment determination on a winning combination by the wining combination establishment/non-establishment determining means is regarded as one game, the payout calculating means changes a payout rate for calculating the payout in accordance with the number of establishment of winning combinations when a plurality of games are executed.

This makes it possible that, in the games performed a plurality of times, the payout can be changed in accordance with the total number of winning combinations established in the games.

Further it is preferable that the above-described gaming machine further includes an instruction input device for inputting designating instruction information indicating the designating instruction.

Further, it is preferable that the above-described gaming machine further includes a card display device displaying the card images using the card data extracted by the extraction means.

In the above-described gaming machine, it is preferable that, in the special game mode, a player is able to play a double-down game and a poker game.

Further, in the above-described gaming machine, it is preferable that, a selecting means select the first card data as a card on the gaming machine side and select the second card data as a card on a player side.

It is preferable that, the selecting means select one the first card data and at least four the second card data.

Furthermore, the present invention provides a control method of a gaming machine of determining establishment/non-establishment of a shift condition for shifting a game mode from a normal game mode to a special game mode and shifting the game mode from the normal game mode to the special game mode based on the determination result, the method including the step of: extracting predetermined number of card data to be used in the special game mode, from a plurality of card data; selecting a first card data and a second card data, from among the predetermined number of extracted card data; determining right/wrong of a designating instruction for designating a result of comparison between the first and second card data, according to the result of comparison between the first card data and second card data; performing an establishment/non-establishment determination on a winning combination based on the predetermined number of extracted card data; and calculating a payout based on the determination result in the right/wrong of a designating instruction or the winning combination establishment/non-establishment determination.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Hereinafter, embodiments of the present invention will be described. Note that the same reference numbers are used for the same components and overlapping description thereof is omitted.

(Entire Configuration of Card Gaming Machine)

Figure 1:
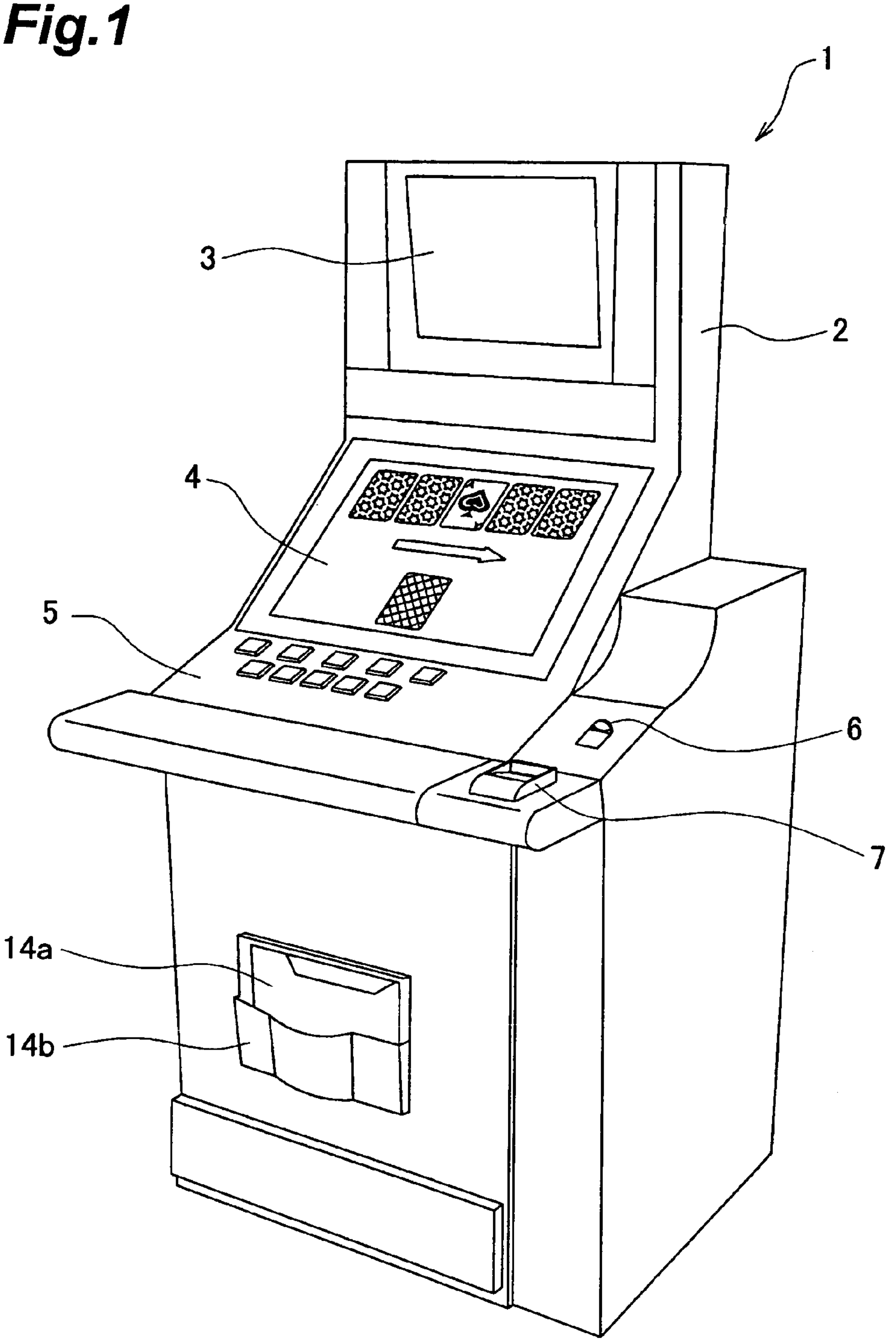
FIG. 1 is a perspective view showing an entire configuration of a card gaming machine being a gaming machine according to an embodiment of the present invention.
Figure 2:
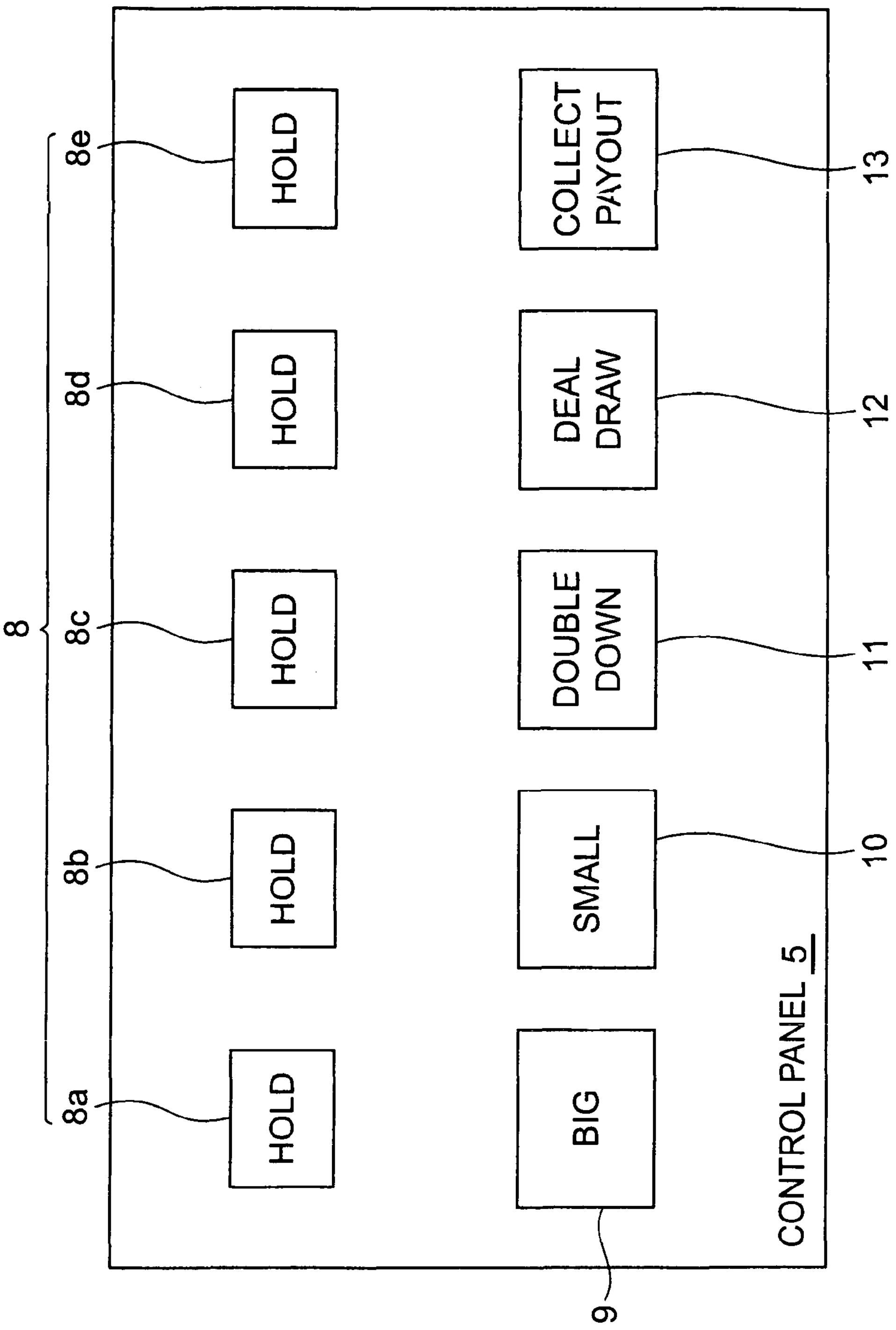
FIG. 2 is a plan view showing an external configuration of a control panel.

FIG. 1 is a perspective view showing an entire configuration of a card gaming machine 1. The card gaming machine 1, which is a gaming machine according to an embodiment of the present invention, has a card display device which displays a plurality of card images and is configured to display the plurality of card images on the card display device so that play of a game (hereinafter referred also to as a "game") can be performed. The card gaming machine 1 has a normal game mode in which the plurality of card images are displayed for a normal poker game (first game) to be played and additionally a special game mode in which the double-down game is executable.

The card gaming machine 1 has liquid crystal display panels 3 and 4 mounted on the front of a cabinet 2 in order from the upper side. On the liquid crystal display panel 3, images that are not directly involved in games (for example, explanation of game contents and so on) are displayed.

The liquid crystal display panel 4 operates as a card display device in the present invention. On the liquid crystal display panel 4, either in the normal game mode and in the special game mode, a plurality of card images are displayed such that the image of the face or back of each card is displayed as if the card is turned or the like in accordance with progress of the game. Note that the contents of the card image to be displayed on the liquid crystal display panel 4 will be described later.

Besides, the cabinet 2 is provided with a control panel 5, a coin insertion slot 6 for inserting coins for betting in a game, and a bill insertion port 7 below the liquid crystal display panel 4. Further, the lower portion of the cabinet 2 is provided with a coin payout opening 14*a* and a coin receiving tray 14*b* which receives paid out coins.

The control panel 5, which is an instruction input device in the present invention, has hold buttons 8*a*, 8*b*, 8*c*, 8*d*, and 8*e*. Further, the control panel 5 has a big button (BIG) 9, a small button (SMALL) 10, a double-down button (DOUBLE DOWN) 11, a deal/draw button (DEAL DRAW) 12, and a collect and payout button (COLLECT PAYOUT) 13.

Figure 3:
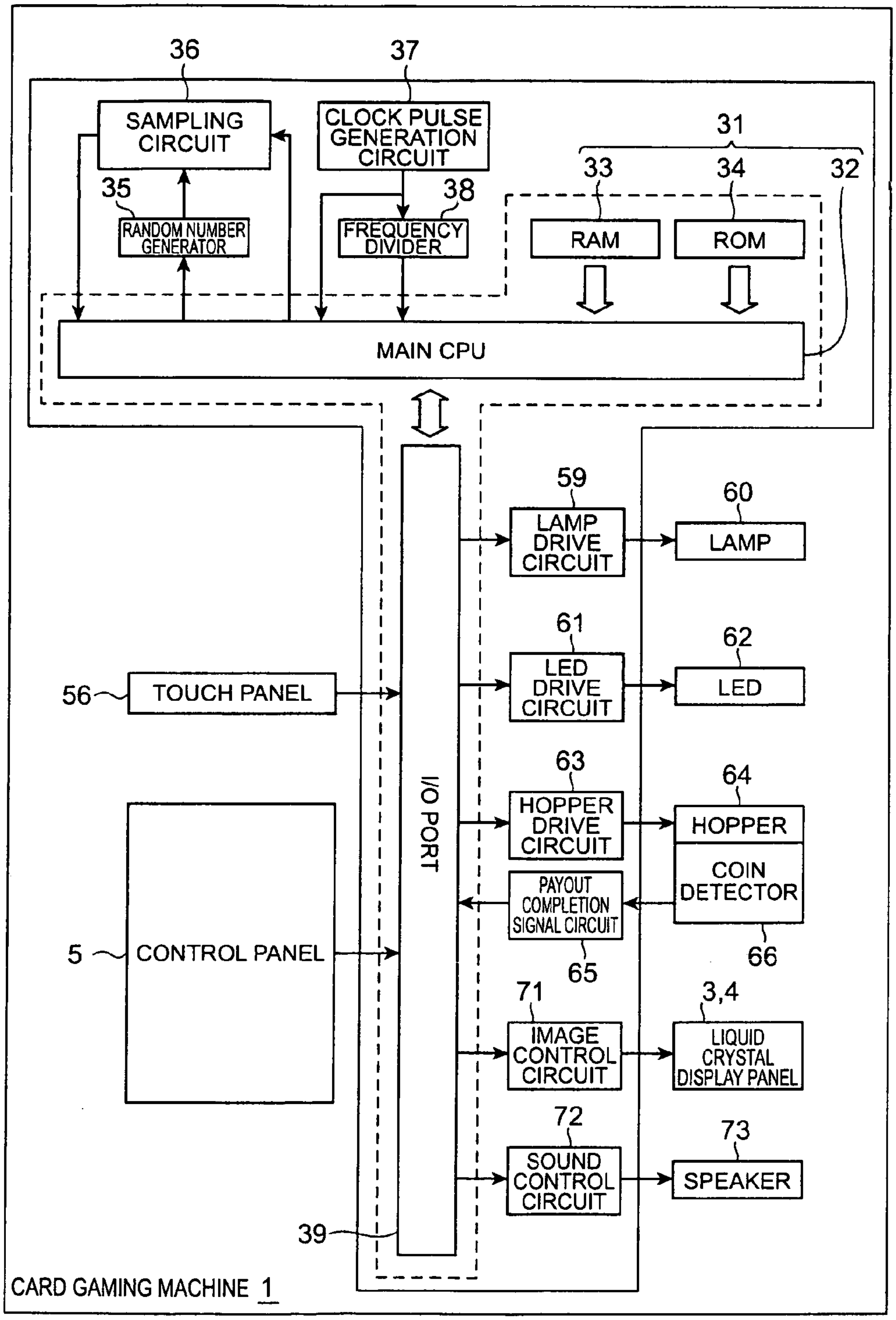
FIG. 3 is a block diagram of the card gaming machine, mainly showing its internal configuration.

FIG. 3 is a block diagram of the card gaming machine 1, mainly showing its internal configuration. The card gaming machine 1 has a plurality of components around a microcomputer 31.

The microcomputer 31 has a main CPU (Central Processing Unit) 32, a RAM (Random Access Memory) 33, and a ROM (Read Only Memory) 34. The main CPU 32 operates in accordance with a program stored in the ROM 34 to input a signal thereinto from each part of the control panel 5 via an I/O port 39, while inputting/outputting signals from/to other components to thereby control the operation of the entire card gaming machine 1. The RAM 33 stores data and programs for use in operation of the main CPU 32, in which, for example, random number values sampled by a later-described sampling circuit 36 are temporarily held after start of a game. The ROM 34 stores programs executed by the main CPU 32 and permanent data.

The card gaming machine 1 further has a random number generator 35, the sampling circuit 36, a clock pulse generation circuit 37, and a frequency divider 38. The random number generator 35 operates in accordance with the instruction from the main CPU 32 to generate random numbers within a certain range. The sampling circuit 36 extracts an arbitrary random number from the random numbers generated by the random number generator 35 in accordance with the instruction from the main CPU 32 and inputs the extracted random number into the main CPU 32. The clock pulse generation circuit 37 generates a reference clock for bringing the main CPU 32 to operate, and the frequency divider 38 inputs into the main CPU 32 a signal obtained by frequency-dividing the reference clock by a certain period.

The card gaming machine 1 further has a touch panel 56, a lamp drive circuit 59, a lamp 60, an LED drive circuit 61, an LED 62, a hopper drive circuit 63, a hopper 64, a payout completion signal circuit 65, and a coin detector 66. The card gaming machine 1 further has an image control circuit 71, a sound control circuit 72, and a speaker 73.

The touch panel 56 is provided in such a manner as to cover the display screen of the liquid crystal display panel 4 to detect the position of a place where a finger of the player touches and input into the main CPU 32 a position signal corresponding to the detected position. The lamp drive circuit 59 outputs to the lamp 60 a signal for turning on the lamp 60 to cause the lamp 60 to flash during execution of a game. With this flash, effective performance is realized. The LED drive circuit 61 controls flash display of the LED 62. The LED 62 performs credit-number display, acquired-coin number display, and so on. The hopper drive circuit 63 drives the hopper 64 under the control of the main CPU 32, and the hopper 64 performs operation for paying out coins for winning to pay out coins from the payout opening 14*a*. The coin detector 66 counts the number of coins paid out by the hopper 64 and sends data on the counted number value to the payout completion signal circuit 65. The payout completion signal circuit 65 receives the data on the number value of coins from the coin detector 66 and inputs a signal notifying completion of the payout of coins into the main CPU 32 when the number value reaches data of the set number.

The image control circuit 71 controls image display on each of the liquid crystal display panels 3 and 4 to cause the liquid crystal display panels 3 and 4 to display various images such as card images and the like.

Figure 4:
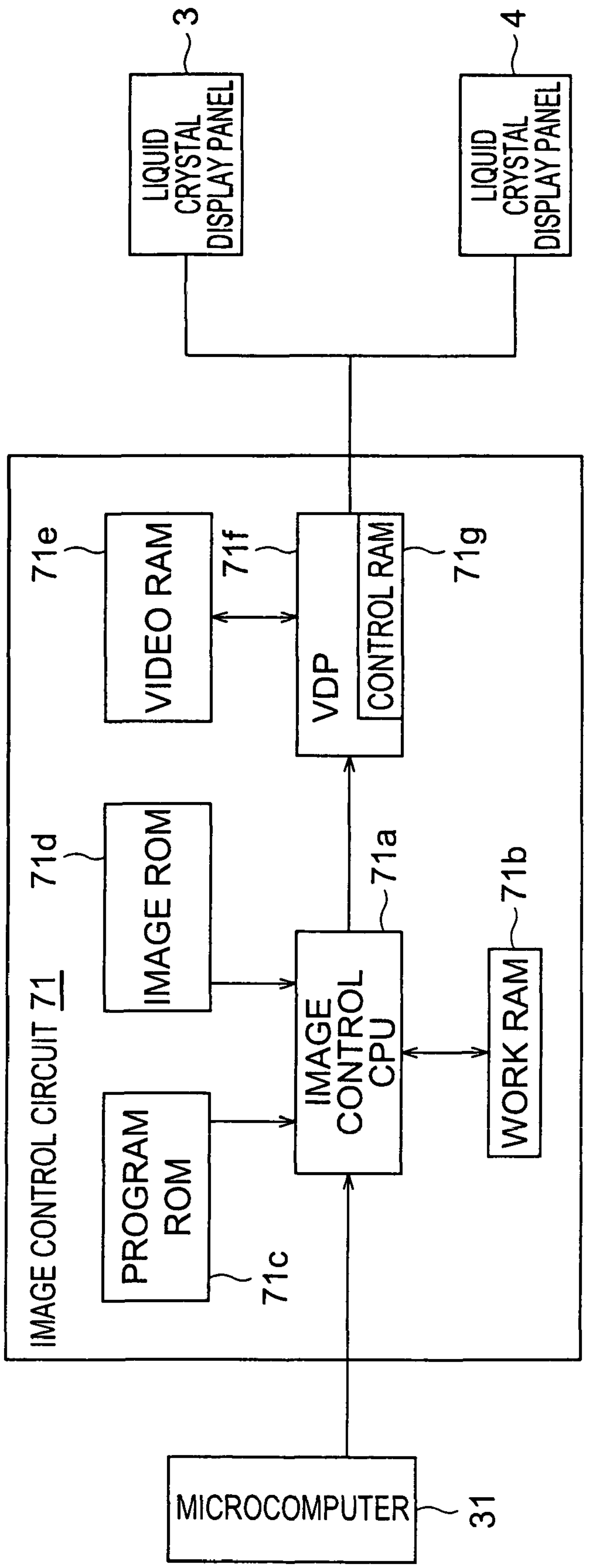
FIG. 4 is a block diagram showing an example of an internal configuration of an image control circuit.

The image control circuit 71 has, as shown in FIG. 4, an image control CPU 71*a*, a work RAM 71*b*, a program ROM 71*c*, an image ROM 71*d*, a video RAM 71*e*, and a VDP (Video Display Processor) 71*f*. The image control CPU 71*a* decides the images to be displayed on the liquid crystal display panels 3 and 4 based on parameters set by the microcomputer 31 in accordance with an image control program (relating to the displays on the liquid crystal display panels 3 and 4) stored in the program ROM 71*c* in advance. The work RAM 71*b* is constituted as a temporary memory when the image control CPU 71*a* executes the image control program.

The program ROM 71*c* stores the image control program, various selection tables, and so on. The image ROM 71*d* stores dot data for forming images. The dot data includes, in this embodiment, image data on card images showing 52 playing cards (hereinafter referred to as a "card image group") for use in poker games in the first game and the double-down game. The video RAM 71*e* is constituted as a temporary memory when the VDP 71*f* forms images. The VDP 71*f* having a control RAM 71*g* forms images matching the display contents on the respective liquid crystal display panels 3 and 4 decided by the image control CPU 71*a*, and outputs the respective images formed to the liquid crystal display panels 3 and 4.

The sound control circuit 72 inputs into the speaker 73 a sound signal for outputting sound from the speaker 73. From the speaker 73, sound for making a game more exciting is outputted, for example, at an appropriate timing after start of the game.

(Operation Contents of Card Gaming Machine)

Figure 5:
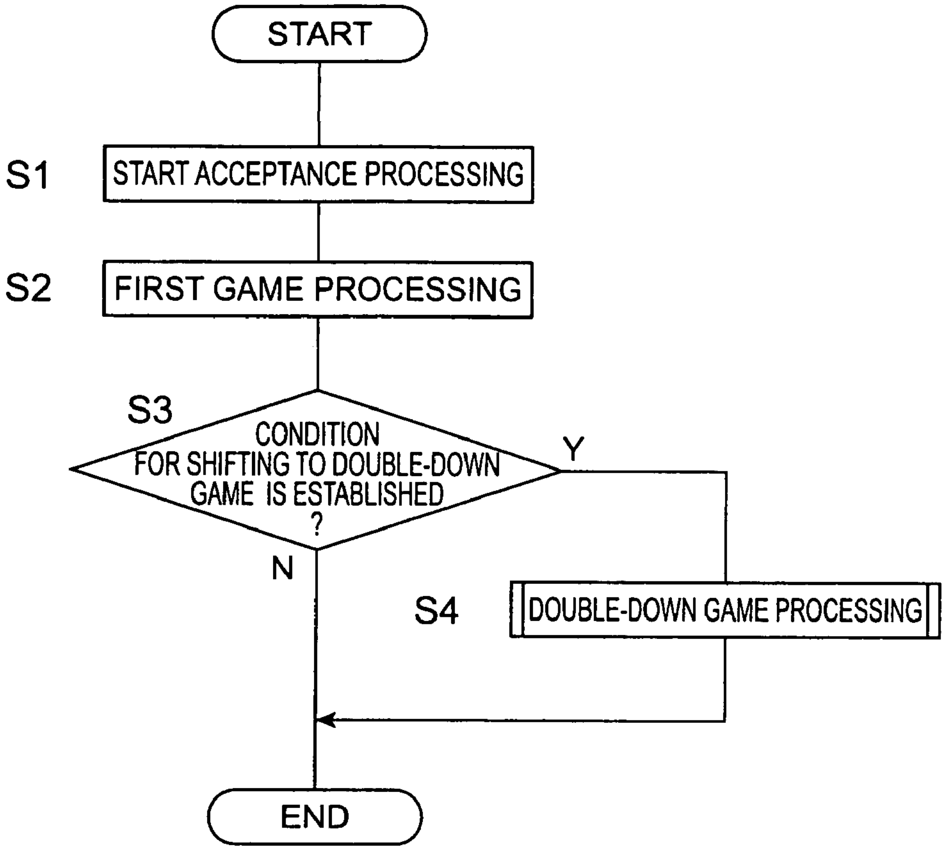
FIG. 5 is a flowchart showing an operation procedure from a start to an end of a game in the card gaming machine.

Next, operation contents of the card gaming machine 1 having the above-described configuration will be described with reference to flowcharts shown in FIG. 5 and FIG. 6. In the card gaming machine 1, as shown in FIG. 5, the first game is executed first, and then the double-down game is executed under a certain condition. The first game is described as the poker game in the following illustration, but the first game executed by the gaming machine in the present invention is not limited to the poker game. The game may be, for example, another game such as the blackjack game or the like. Alternatively, instead of the card images as the images to be displayed on the liquid crystal display panel 4, a plurality of reels (for example, three or five) each having a plurality of symbols thereon may be arranged side by side, and variable display images as if the respective reels scroll may be displayed to execute a game in which the payout amount is decided depending on the combination of symbols at the point of time when the reels stop (slot machine game). In the case of the slot machine game, however, the buttons on the control panel 5 are preferably made to correspond to the operation of the slot machine.

FIG. 5 is a flowchart showing the operation procedure of the main processing from the start to the end of a game in the card gaming machine 1. Note that Step is abbreviated to S in FIG. 5 and FIG. 6. As shown in FIG. 5, the card gaming machine 1 after starting the main processing performs start acceptance processing in Step 1 for starting a game.

After the processing proceeds to the start acceptance processing in Step 1, the card gaming machine 1 accepts the operation for starting the poker game from the player under the control of the main CPU 32. To start the poker game, the player first inserts a number of coins to be bet in one game through the coin insertion slot 6. Then, the processing proceeds to Step 2, in which first game processing is performed. Here the poker game is performed.

Figure 8:
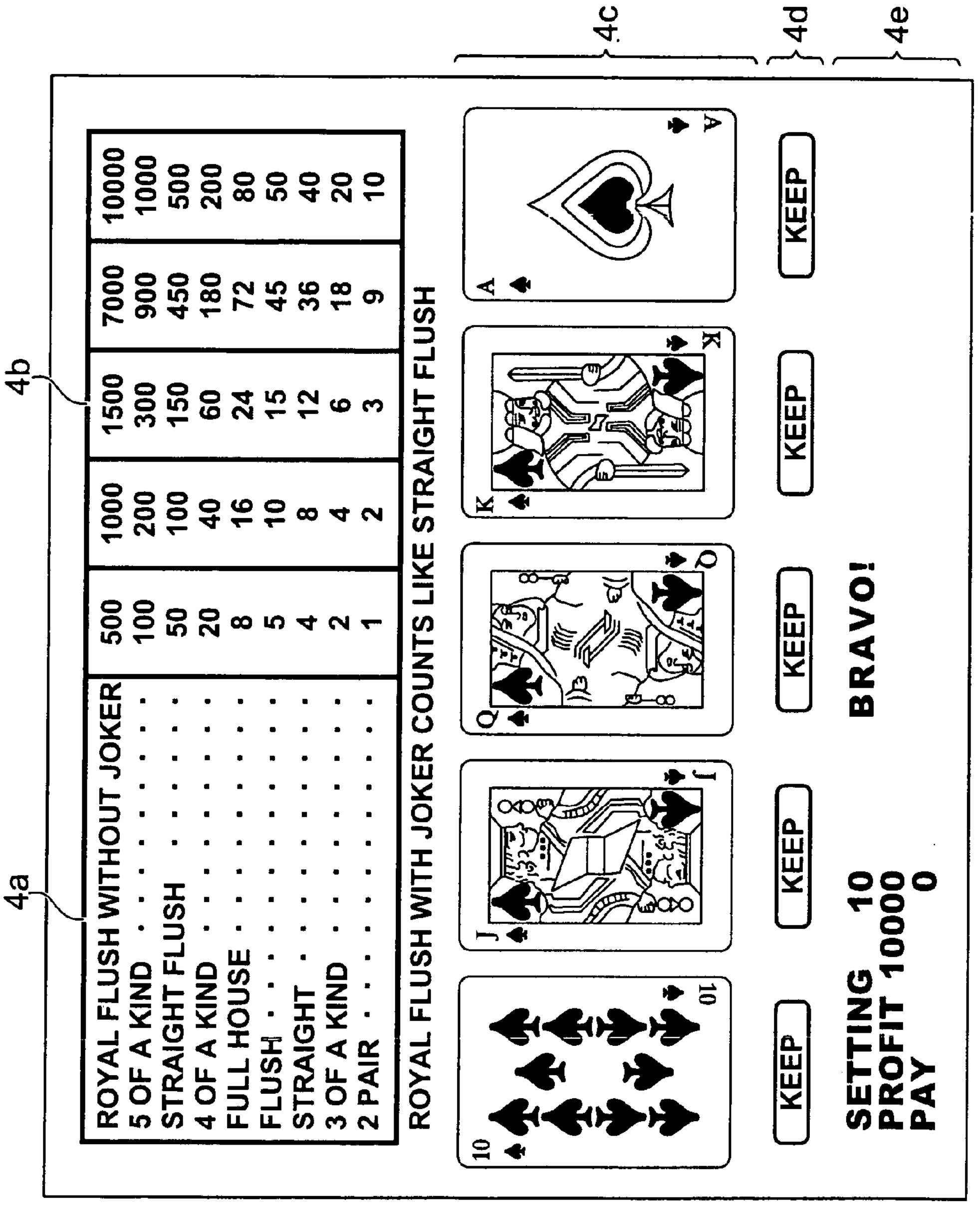
FIG. 8 is a view showing an example of a display screen of the liquid crystal display panel during execution of a poker game.

In the poker game as the first game, card images of five cards to be used in the game are displayed on the liquid crystal display panel 4. In this event, on the liquid crystal display panel 4, as shown in FIG. 8, a winning combination display section 4*a* where the names of winning combinations such as royal flush, full house, and so on are displayed, a payout amount display section 4*b* where payout amounts are displayed, a card display section 4*c* where images of cards to be used in the game are displayed, a status display section 4*d* where the status of each of the cards is displayed, and a point display section 4*e* where the points the player acquired are displayed are provided, and the card images of the cards for use in the game are displayed in the card display section 4*c*. Note that numbers, a state in which characters, figures, and so on are displayed in the respective sections of the liquid crystal display panel 4 is shown in FIG. 8 for illustration, and this state shows an image assuming that the first game has been executed and a particular winning combination (royal flush) is established.

Then, when the card images are changed in accordance with the operation input by the player through the control panel 5 and if a winning combination of the poker game is established by the card images displayed in the card display section 4*c*, payout is performed based on the payout (first reference payout) being a reference of payout set for each winning combination and on the BET number. In this case, for example, when 10 coins are bet and the winning combination "flush" is established, the payout is 80 (the first reference payout of "flush" in this case is "8").

When the processing proceeds to Step 3 after the end of the first game (poker game), the main CPU 32 operates as determining means to determine whether the condition for shifting the game to the double-down game (hereinafter, referred to as a "shift condition" and to also as a trigger) is established or not in the poker game executed in Step 2 (establishment/non-establishment of the shift condition), so that when the shift condition is established, the main CPU 32 operates as shifting means based on the determination result to shift the game mode from a normal game mode to a special game mode, whereby the processing proceeds to Step 4. When the shift condition is not established, the main CPU 32 ends the main processing without executing Step 4.

Here, for example, establishment of a particular winning combination (royal flush, full house, or the like) where the first game is the poker game can be regarded as the establishment of the shift condition. Alternatively, that a particular card (for example, a joker card) is displayed can be regarded as the establishment.

Note that, not shown, the main CPU 32 makes inputs at the double-down button 11 and the collect and payout button 13 on the control panel 5 effective at the point of time when the above-described shift condition is established, so that when there is an operation input at the effective double-down button 11, the double-down game is started. If there is an operation input at the collect and payout button 13, coins according to the acquired number until then is paid out and the processing is ended.

Figure 6:
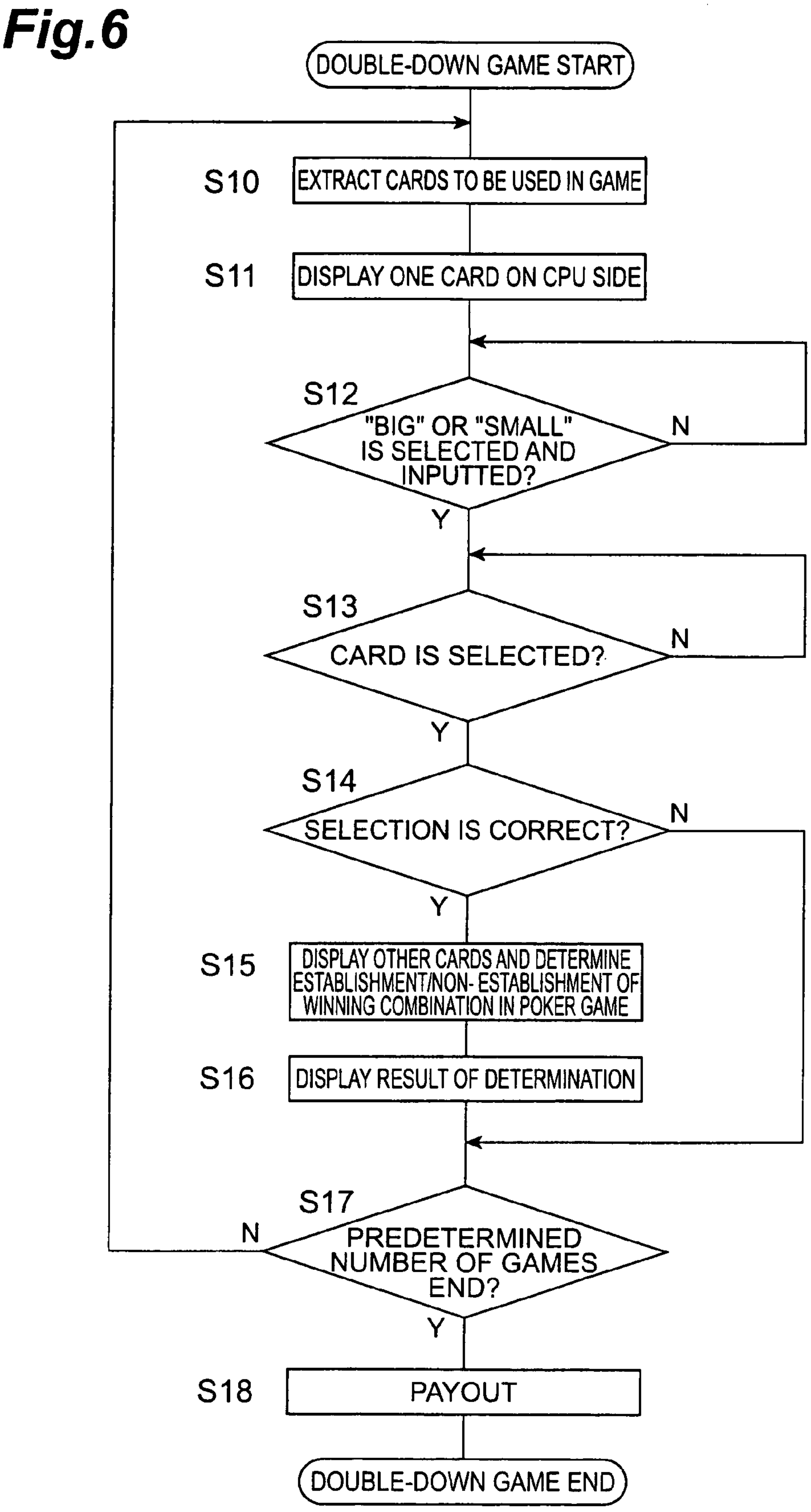
FIG. 6 is a flowchart showing an operation procedure of a double-down game processing.

Then, after the processing proceeds to Step 4, in which when the double-down game is started, the processing proceeds to Step 10 shown in FIG. 6 in which the main CPU 32 operates as extraction means to extract image data for a predetermined number of card images of cards to be used in the double-down game(image data for a card image is referred to as “card data”.) Note that, in addition to image data, number on the card , mark on the card , and so on ,information for specifying each of the card image are included in card data. In this event, the main CPU 32 extracts card data for displaying a predetermined number of cards on the liquid crystal display panel 4 from the card image group referring to the data obtained from the sampling circuit 36. In this embodiment, five card data for displaying five cards are extracted (here the card image corresponding to the extracted card data is referred to as “extracted card image”). Next, when the processing proceeds to Step 11, the main CPU 32 operates as selecting means to select first card data to be displayed as a card on the gaming machine side (for example, a card with number “7” on the face side as a playing card (hereinafter referred to as a “reference card”)), from the card data extracted in Step 10. Further, the main CPU 32 causes the liquid crystal display panel 4 to display extracted card images 91 to 95 using the card data for the extracted card images 91 to 95 including the image of the reference card (reference card image) 91.

Figure 7:
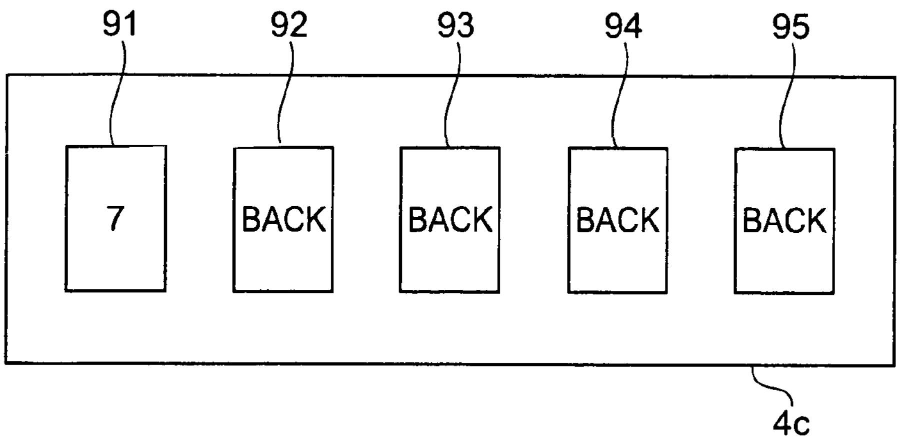
FIGS. 7 is views showing a plurality of card images to be displayed on a liquid crystal display panel during the operation of the double-down game processing, (a) showing a state of only a reference card image facing up, (b) showing a state of the reference card image and an object card image facing up, and (c) showing a state of all card images facing up.
Figure 7:
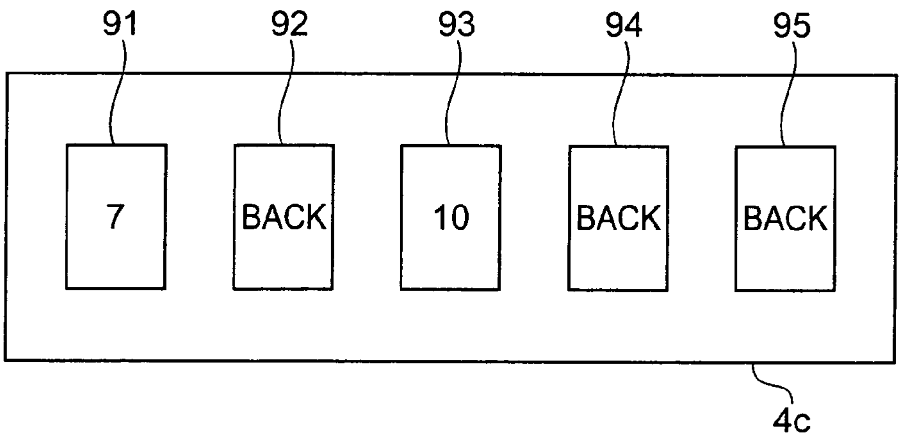
Figure 7:
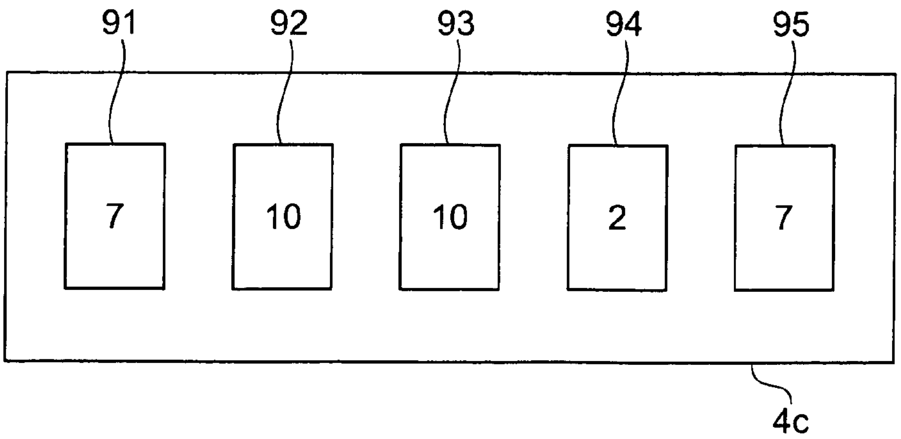

Then, as shown in FIG. 7(*a*), the reference card image 91 is displayed on the leftmost side as the player faces (the card display section 4*c* of) the liquid crystal display panel 4, and the other four extracted card images 92, 93, 94, and 95 are displayed side by side in order. In this case, the image of the face side of the reference card 91 is displayed, while the images of the back sides of the other extracted card images 92, 93, 94, and 95 are displayed (the display of “Back” in FIG. 7 indicates that each card image is the image of the back side of a playing card). Note that all of the numbers on the extracted card images 92, 93, 94, and 95 may have already been decided at this point of time, or at the point of time when the player selects a card in Step 13, the number on the extracted card image selected may be decided.

Next, the main CPU 32 proceeds to Step 12 and waits until the player inputs a later-described designating instruction, and proceeds to Step 13 when receiving the input of the designating instruction. In this event, the main CPU 32 preferably causes the liquid crystal display panel 4 to display a display (for example, “INPUT BIG OR SMALL!”) to prompt the player to input, from the control panel 5, an instruction (bigger/smaller) for designating (hereinafter, referred to as a “designating instruction”) whether the number on a card that the player is selecting from the extracted card images 92 to 95 except the reference card image 91 is bigger or smaller than the number (“7” here) on the reference card image 91. In this event, the player operates either the big button (BIG) 9 or the small button 10 to thereby input the designating instruction. The following description is made assuming that the player operates the big button (BIG) 9 to input “bigger”. Note that the sequence of Step 12 and Step 13 may be changed.

It should be noted that in this embodiment, although it is assumed that both instructions bigger and smaller can be inputted as the designating instruction in Step 12, it is also possible to allow only one of the instructions bigger and smaller to be inputted and to change the buttons of the control panel 5 in correspondence therewith (only one of the big button 9 and the small button 10 is provided) . In this case, the player selects only one card image, from among the extracted card images 92, 93, 94 and 95, matching being bigger or smaller in relation to the reference card image 91 in the subsequent Step 13.

Then, when the player operates the big button (BIG) 9 or the small button (SMALL) 10 on the control panel 5 in correspondence with his or her own selection, designating instruction information to be used in Step 14 is inputted from the control panel 5 to the main CPU 32 in response to the operation input at the either button. Next, the main CPU 32 proceeds to Step 13 and waits until the player selects one card (hereinafter, referred to as an “object card”) that is an object to be subjected to a bigger/smaller comparison from among the extracted card images 92, 93, 94, and 95. In this event, the main CPU 32 preferably causes the liquid crystal display panel 4 to display a display (for example, “SELECT ONE CARD!”) to prompt the player to select the object card.

The main CPU 32 determines whether the player selects the object card based on the presence or absence, from the touch panel 56, of input of information (card specification information) for specifying one of the extracted card images 92, 93, 94, and 95. On the other hand, when the card specification information is inputted, the main CPU 32 operates as selecting means to select card data corresponding to the card specification information as second card data on the player side. Then, as shown in FIG. 7(*b*), the main CPU 32 causes the liquid crystal display panel 4 to display the second card image as the object card with its face side up using the second card data. Note that the extracted card image 93 is selected by the player and displayed as the object card.

Next, when the object card is selected, the main CPU 32 proceeds to the subsequent Step 14 and operates as right/wrong determining means to operate as follows. In this event, the main CPU 32 determines the designating instruction right/wrong through use of the number on the card mark on the card for specifying each of the card images, out of card data corresponding to each of the first and second card images, that is, through a bigger/smaller comparison between the number (“7” here) on the reference card image 91 and the number (“10” here) on the extracted card image 93 and through use of the designating instruction information inputted in Step 12, depending on the comparison result. In other words, the main CPU 32 determines whether the fact that the number on the extracted card image 93 is “bigger” or “smaller” than the number on the reference card image 91 matches the designating instruction information, and determines that the designating instruction is “right” if there is a match and “wrong” if there is no match. (Note that it is also suitable here that the case in which the number on the reference card image 91 is equal to the number on the object card image 93 is regarded as a draw and included in the determination "wrong". Incidentally, it may be included in the determination "right".)

Then, when the selection of the player is correct (when the determination "right" is made), the processing proceeds to Step 15, and when the selection is incorrect (when the determination "wrong" is made), the processing proceeds to Step 17 without execution of Step 15 and Step 16. In Step 15, the main CPU 32 instructs the image control circuit 71 to display with their face sides up the other extracted card images 92, 94, and 95 which have been kept displayed with their back sides up, out of the extracted card images 92, 93, 94, and 95, on the liquid crystal display 4. Further, the main CPU 32 operates as winning combination establishment/non-establishment determining means to determine whether a winning combination in the poker game is established or not based on the card data corresponding to the respective reference card image 91 and the extracted card images 92, 93, 94, and 95 whose face sides are turned up. Further, the processing proceeds to Step 16 in which the main CPU 32 causes the liquid crystal display panel 4 to display the result of the winning combination determination (a display notifying the establishment/non-establishment of a winning combination and the name of the established winning combination). Note that, as shown in FIG. 7(*c*), the winning combination "two pair" is established here by two cards with number "10" matched by the extracted card images 92 and 93.

Next, the processing proceeds to Step 17, in which the main CPU 32 determines, regarding processing from Step 10 to Step 16 as one game, whether or not the game is executed a predetermined number of times (for example, determines based on whether or not a game number counter indicates a predetermined number or more), and the processing proceeds to Step 18 if executed or returns to Step 10 if not executed. When the processing returns to Step 10, the main CPU 32 instructs the image control circuit 71 to draw off the five cards already displayed on the liquid crystal display panel 4 and return to and display images of the remaining playing cards, and then the main CPU 32 returns to Step 10 to extract predetermined number of card data in a manner similar to the above-described.

In Step 18, the main CPU 32 operates as payout calculating means to calculate the payout based on the right/wrong determination result in Step 14 and the winning combination establishment/non-establishment determination result (the establishment/non-establishment of a winning combination and the established winning combination) in Step 15. Further, the main CPU 32 instructs the hopper drive circuit 63 to perform payout in accordance with the calculated payout. Then, upon receipt of the instruction, the hopper drive circuit 63 issues an instruction of payout of a payout of coins, so that the hopper 64 pays out coins. Here the main CPU 32 operating as the payout calculating means calculates the payout using a second reference payout set separately from that for the first game. Although the second reference payout when no winning combination is established is set to 0 so that the payout becomes 0 here, the second reference payout may be set such that the payout becomes smaller than that when a winning combination is established and does not become 0. With that the double-down game is ended.

As described above, according to the present invention, the double-down game is executed under a certain condition in the card gaming machine 1. In the double-down game, the player is allowed to select whether the number on the card image selected by the player is bigger or smaller than the number on the reference card image selected on the card gaming machine 1 side, and the player is allowed to win when the selection is right. Additionally, the establishment/non-establishment determination on a winning combination in the poker game is also performed, so that when a winning combination is established, the payout is larger than that when no winning combination is established, that is, the payout is changed according to the establishment/non-establishment of a winning combination. Therefore, the card gaming machine 1 presents not only an expectation that the player may win in the bigger/smaller comparison between cards associated with the selection by the player, but also an expectation that a winning combination of the poker game may be established, and additionally an expectation that the payout may increase if it goes well. Therefore, according to the present invention, the contents of the double-down game are provided with additional other varied game properties, such as establishment/non-establishment of a winning combination of the poker game, thus making it possible to keep the interest of the player, particularly a player who prefers gambling.

In the above description of operation, only when the right/wrong determination in Step 14 is "right", the processing proceeds to Step 15 in which the main CPU 32 is caused to operate as a wining combination establishment/non-establishment determining means to determine whether or not a winning combination in the poker game is established. However, it is also suitable to perform the establishment/non-establishment determination on a winning combination in the poker game even when the right/wrong determination in Step 14 is "wrong". In this case, however, it is preferable that the payout is made different between the case of "right" and the case of "wrong" of the right/wrong determination in Step 14, and that the second reference payout is set such that the payout in the case of "right" becomes larger.

Further, in the above description of operation, the game can be repeated a plurality of times, in which the payout may be changed for each game. For example, the number of games is counted by the main CPU 32 so that the second reference payout may be multiplied by a multiplier in accordance with the number of games (this multiplier is for calculating the payout and referred to as a "payout rate" hereinafter). For example, when the number of games is 1 to 6 (a first game to a sixth game), the payout rate can be 1, and the number of games is 7 (a seventh game), the payout rate can be 2. This results in that even when right or wrong of the selection by the player is the same and the established winning combination is the same in the games, the payout is increased only in the seventh game, to be doubled that of the first game to the sixth game.

Further, it is also suitable to count the number of wins and losses in the games by the main CPU 32 (the win case is counted when the designating instruction is determined as right) and to change the payout rate in accordance with the number of win games (the number of wins). For example, in the games with the total number of games is 7, the payout rate can be set such that the payout rate is 1 when the number of wins is 0, the payout rate is double when the number of wins is 1, the payout rate is triple when the number of wins is 2 to 6, and the payout rate is ten times when the number of wins is 7 (hereinafter, this setting is referred to as "multiplier setting"). As a result of this, the more the player wins, the more the payout increases, thus making it possible to further enhance the attractiveness of the game.

Based on the foregoing, the payout (payout amount) can be calculated also by the following Equation 1. For example, $$\text{Payout amount } H=(\text{BET number}+X)*S \qquad \text{Equation 1:}$$

X: total winning combination payout amount, S: payout rate in accordance with the number of wins In this Equation 1, it is assumed that, for example, the BET number: 10, the number of games: 7, the number of wins: 4 times (the payout rate is triple based on the multiplier setting), payout is performed only at the time of win, the winning combinations in the wins are “two pair”, “no winning combination established”, “no winning combination established”, and “flush”, and the respective payout are 10 (two pair), 0 (no winning combination established), 0 (no winning combination established), and 50 (flush). In this case, the total winning combination payout amount X is:

$$X=10+0+0+50=60$$

therefore, the payout amount H is:

$$H=(10+60)*3=210.$$

In the above-described card gaming machine 1, the right/wrong determination on the designating instruction in Step 14 is performed using the designating instruction information inputted by the player operating the control panel 5. In this event, the card gaming machine 1 allows the player to select whether the number on the card that the player is selecting is bigger or smaller than the number on the reference card image 91 (this selection is referred to as a “bigger/smaller selection”).

The card gaming machine 1 in this embodiment, however, may perform the right/wrong determination on the designating instruction without using the designating instruction information. For example, the main CPU 32 may decide that it is either bigger or smaller with a predetermined probability and perform the right/wrong determination on the designating instruction using decision information indicating the decision. In this event, the player is only required to select a card image and not to perform the bigger/smaller selection, thus eliminating the need for the big button (BIG) 9 and the small button 10.

Figure 9:
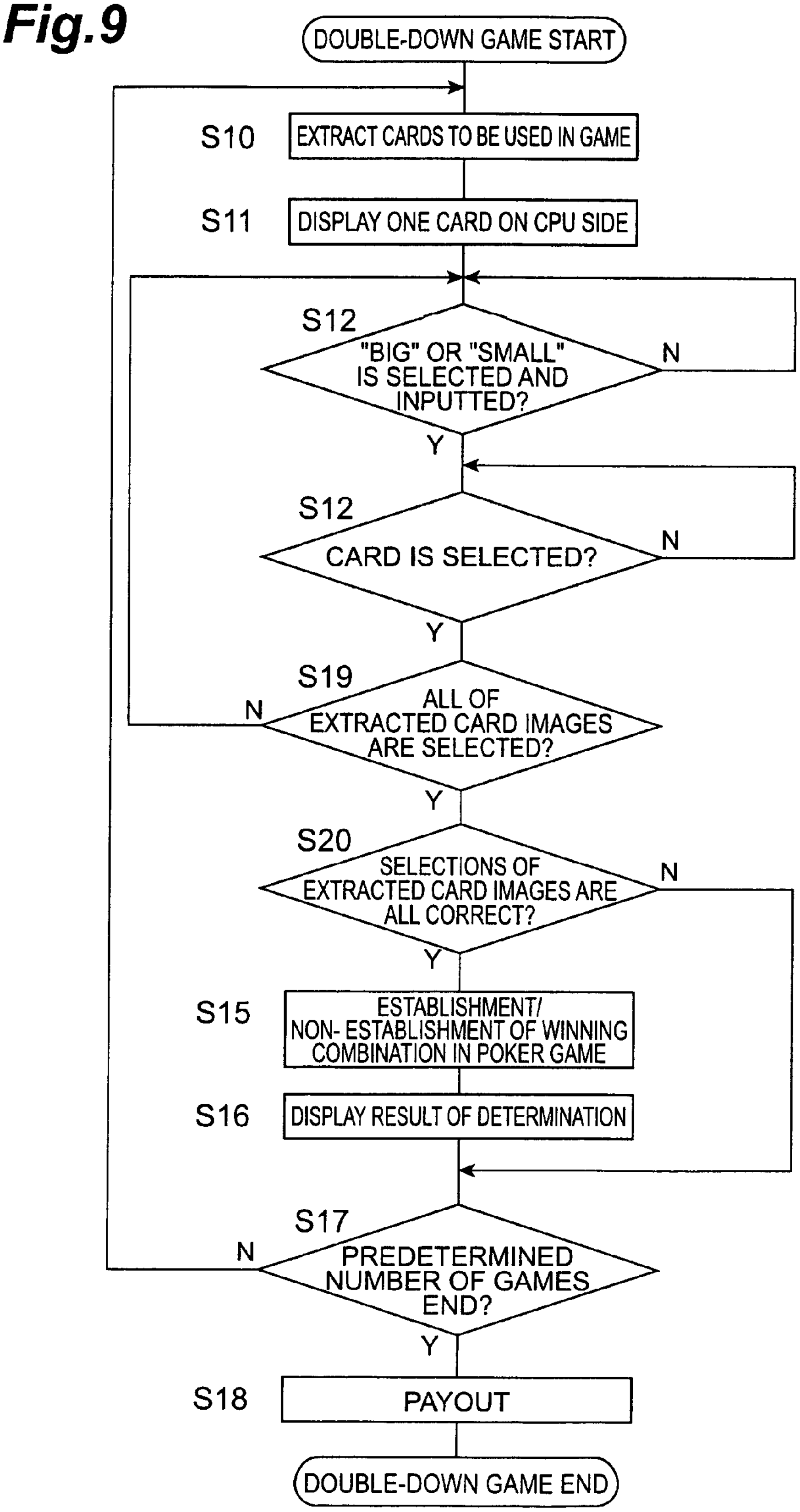
FIG. 9 is a flowchart showing an operation procedure of another double-down game processing.

Further, as shown in FIG. 9, Steps 19 and 20 may be provided instead of step 14 between Step 13 and Step 15. In this Step 19, it is determined whether all of the extracted card images 92, 93, 94, and 95 are selected. When all of them are selected, the processing proceeds to Step 20, and otherwise processing returning to Step 12 is executed. Then, in Step 20, the right/wrong determination on the designating instruction is performed for the number on the reference card image 91 and the number on each of the extracted card images 92, 93, 94, and 95. When the selections by the player for the respective extracted card images 92, 93, 94, and 95 are all correct, the processing proceeds to Step 15, and otherwise processing is executed to proceed to Step 17. This provides a chance to the player to select all of the extracted card images 92, 93, 94, and 95, thereby enhancing the player’s interest.

Note that in Step 13, the main CPU 32 may select the object card. The main CPU 32 may proceed to Step 20 without selection of all of the extracted card images 92, 93, 94, and 95. In Step 20, the main CPU 32 may determine for every card image whether player selection is right.

As has been described, according to the present invention, in a gaming machine on which card games including the double-down game can be played and a control method of the card gaming machine, other varied game properties can be added to the double-down game to keep the player’s interest.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A gaming machine comprising:

a controller configured to (a) determine, during a normal game, establishment/non-establishment of a shift condition for shifting, after the normal game, a game mode from a normal game mode to a special game mode including first and second games, the first game being different from the second game and the second game being the same as the normal game;

(b) shift, during the normal game, the game mode from the normal game mode to the special game mode based on a result of the determination in (a);

(c) extract, during the special game mode, a plurality of items of card data used in the first and second games of the special game mode at time of the shifting from the normal game to the special game mode;

(d) select, during the first game of the special game mode, a first card data as a card on a gaming machine side and a second card data as a card on a player side, from among the plurality of items of card data extracted in (c);

(e) determine, during the first game of the special game mode, a win/loss result based on a comparison between the first card data and the second card data;

(f) perform, during the second game of the special game mode, an establishment/non-establishment determination on a winning combination corresponding to the normal game, based on the plurality of items of card data extracted in (c), including the first and second cards used in the first game, in a case of win of the second card data on the player side as a result of the determination in (e); and (g) calculate, during the special game mode, a payout of the special game mode based on a result of the establishment/non-establishment determination in (f) during the second game, wherein a payout rate for calculating the payout is changed during the calculation of the payout, in accordance with the number of times the winning combination is established during the second special games in a case where a set of the special game mode shifted after the normal game and the second special game executed in accordance with a result of the special game mode is executed a plurality of times.

2. A method for controlling games performed on a gaming machine, comprising the steps of:

(a) determining, during a normal game, establishment/non-establishment of a shift condition for shifting, after the normal game, a game mode from a normal game mode to a special game mode including first and second games, the first game being different from the second game and the second game being the same as the normal game;

(b) shifting, during the normal game, the game mode from the normal game mode to the special game mode based on a result of the determination in (a);

(c) extracting, during the special game mode, a plurality of items of card data to be used in the first and second games of the special game mode at time of the shifting from the normal game to the special game mode;

(d) selecting, during the first game of the special game mode, a first card data as a card on a gaming machine side and a second card data as a card on a player side, from among the plurality of items of card data extracted in (c);

(e) determining, during the first game of the special game mode, a win/loss result based on a comparison between the first card data and the second card data;

(f) performing, during the second game of the special game mode, an establishment/non-establishment determination on a winning combination corresponding to the normal game, based on the plurality of items of card data extracted in (c), including the first and second cards used in the first game, in a case of win of the second card data on the player side as a result of the determination in (e); and (g) calculating, during the special game mode, a payout of the special game mode based on a result of the establishment/non-establishment determination in (f) during the second game, wherein a payout rate for calculating the payout is changed during the calculation of the payout, in accordance with the number of times the winning combination is established during the second special games in a case where a set of the special game mode shifted after the normal game and the second special game executed in accordance with a result of the special game mode is executed a plurality of times.

3. A gaming machine comprising:

a display panel for displaying a card image; and a controller for controlling a game, the controller being configured to:

(a) extract, during a normal game, card data associating a card required to execute a poker game from a plurality of items of card data and display the extracted card data on the display panel, and in a case where a displayed game result shows establishment of a combination in the poker game, award a payout in accordance with the combination;

(b) determine whether or not the result displayed in (a) shows a trigger for shifting from the normal game to a double-down game;

(c) execute the double-down game in a case where a result of the determination in (b) shows the trigger for shifting to the double-down game, wherein the double-down game includes:

a first game for determining a win/lose result based on a bigger/smaller comparison between numbers indicated on the card images on a player side and a machine side, respectively; and a second game for executing the poker game during the double-down game after the first game, in accordance with a result of the first game, and (d) determine in random the plurality of items of card data for enabling execution of each of the first and second games and display the determined plurality of items of card data on the display panel;

(e) determine the win/lose result on the player side or machine side based on input of a bigger or smaller number by the player, upon execution of the first game after the display of the plurality of items of card data on the display panel in (c);

(f) execute the second game as the poker game in a case where the player side wins as a result of the determination in (e), and determine whether or not the plurality of items of card data determined in (c) shows establishment of the combination in the poker game; and (g) determine the payout of the double-down game in accordance with the combination in the poker game, in a manner similar to that of the normal game, in a case where the combination in the poker game is established as a result of the determination in (f) during the second game, wherein a payout rate for determining the payout is changed during the determination of the payout, in accordance with the number of times the winning combination is established during the second games in a case where a set of the double down game shifted after the normal game and the double down game executed in accordance with a result of the double down game mode is executed a plurality of times.

* * * * *